United States Patent [19]

Shin

[11] 3,953,561

[45] Apr. 27, 1976

[54] FIRING PROCESS FOR ALUMINA YARN

[75] Inventor: Hyunkook Shin, Wilmington, Del.

[73] Assignee: E. I. Du Pont de Nemours and Company, Wilmington, Del.

[22] Filed: Feb. 19, 1975

[21] Appl. No.: 551,003

Related U.S. Application Data

[63] Continuation-in-part of Ser. No. 301,504, Oct. 27, 1972, abandoned, which is a continuation-in-part of Ser. No. 155,737, June 23, 1971, abandoned.

[52] U.S. Cl. .................................... 264/57; 106/62; 106/65; 264/56; 264/63; 264/64; 264/DIG. 19
[51] Int. Cl.² ........................................... F27B 9/14
[58] Field of Search .................. 106/62, 65; 264/63, 264/64, DIG. 19

[56] References Cited
UNITED STATES PATENTS

| | | | |
|---|---|---|---|
| 3,108,888 | 10/1963 | Bugash | 106/62 |
| 3,180,741 | 10/1963 | Wainer | 106/62 |
| 3,271,173 | 9/1966 | Lockhart et al. | 106/65 |
| 3,311,481 | 3/1967 | Sterry | 106/57 |
| 3,311,689 | 3/1967 | Kelsey | 264/210 F |
| 3,560,408 | 2/1971 | Kiehl et al. | 252/463 |
| 3,595,946 | 7/1971 | Joo et al. | 264/29 |
| 3,705,223 | 12/1972 | Pearson et al. | 264/56 |

*Primary Examiner*—Jay H. Woo

[57] ABSTRACT

Process for producing continuous alumina multifilament yarns which comprises preparing an aqueous spinning mix containing selected alumina particles and water-soluble precursors of alumina in selected amounts, spinning filaments from the mix, forming a continuous filament package on a collapsible, refractory bobbin at a windup speed which attenuates the filaments, firing the package in a furnace at selected temperatures in either one or two steps, and then firing the yarn while backwinding it. A bobbin is obtained which is wound with strong substantially straight yarn of at least five aligned polycrystalline α-alumina continuous filaments, which yarn can be backwound from the bobbin.

4 Claims, 4 Drawing Figures cm 0 1 2 3 4 5 6 cm 0 1 2 3 4 5 6 cm 0 1 2 3 4 5 6 cm 0 1 2 3 4 5 6

FIRING PROCESS FOR ALUMINA YARN

CROSS-REFERENCE TO RELATED APPLICATIONS

This application is a continuation-in-part of copending application Ser. No. 301,504, filed Oct. 27, 1972, which is a continuation-in-part of application Ser. No. 155,737, filed June 23, 1971, now abandoned.

BACKGROUND OF THE INVENTION

This invention relates to a process for producing continuous refractory oxide yarns and, more particularly, alumina multifilament yarns.

Refractory oxide fibers have been made in the past by a variety of processes. However, a need has existed for a commercially satisfactory route to a continuous multifilament alumina yarn which can be wound on bobbins for sale and backwound from the bobbins by the customer for ultimate use, e.g., as a reinforcement for metals or plastics.

SUMMARY OF THE INVENTION

In a process for producing continuous polycrystalline alumina yarns by extruding filaments from a mixture of alumina particles and an aqueous solution of an alumina precursor, the improvement comprising winding the yarn of freshly extruded multiple filaments, which contain about 30% to about 60% volatiles, onto a collapsible, refractory bobbin to form a shrinkable, continuous filament yarn package, heating the yarn package to between about 300°C. and 1400°C. for a time to reduce the volatiles content of the yarn to about 11% or less (this step will be referred to as "package firing" hereinafter), and unwinding the yarn from the yarn package and advancing it through a zone of intense heat, thereby heating the yarn to an apparent temperature of between about 1000°C. and about 1800°C.

Preferably, heating in the "yarn firing" step is accomplished by advancing the yarn through an open flame from a combustible gas source.

This process permits production, in a commercially attractive manner, of bobbins of backwindable continuous multiple filament yarns, e.g., of 5, preferably 30 to 400 or more polycrystalline $\alpha$-alumina filaments, with a filament strength of, e.g., 150,000 to 230,000 psi and a yarn strength of 90,000 to 200,000 psi and modulus of 40 million psi for $SiO_2$ containing alumina filaments (Example 2) or 50 to 60 million psi for substantially 100% alumina filaments. Yarn fired individual filaments are exceptionally straight (i.e., nonwavy) and the yarns have high filament-to-filament alignment. Since the yarns are made of strong, continuous aligned filaments which can be backwound from the bobbin, they can be integrated with any suitable continuous process for incorporating aligned reinforcing elements in plastics or metals, thereby permitting maximum utilization of the properties of the reinforcing elements.

DESCRIPTION OF THE DRAWINGS

FIG. 1 shows the bobbin after spinning and winding.

FIG. 2 shows the bobbin after low temperature firing during the package firing step.

FIG. 3 shows the bobbin after high temperature firing during the package firing step, and FIG. 4 shows the bobbin after the yarn firing step.

DESCRIPTION OF THE PREFERRED EMBODIMENTS

Figure 1:
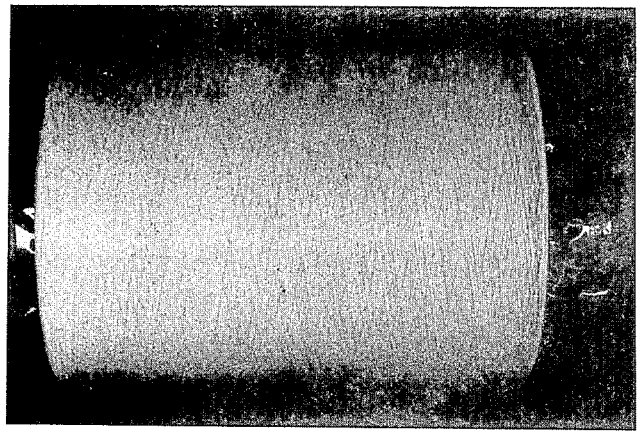
FIGS. 1–4 are photographs of wound bobbins at various intervals of the process described in Example 3.

The general process for making polycrystalline alumina fibers from the mixtures employed herein has been described by Seufert in U.S. Pat. No. 3,818,015 and by D'Ambrosio in U.S. Pat. No. 3,853,688. Such mixtures are comprised of solid particles in an aqueous phase. When measured for equivalent spherical diameter (e.s.d.), all of the solid particles are smaller than $5\mu$, 98% by weight or more are smaller than $3\mu$, and preferably smaller than $1\mu$, and 50% or more, preferably 80% or more, are smaller than $0.5\mu$; and, when measured from electron micrographs, they have no dimension less than about $0.005\mu$. The particles contain at least 80% $Al_2O_3$, preferably $\alpha$-alumina or gamma-alumina. Most preferably, the particles are substantially 100% $Al_2O_3$.

The aqueous phase has dissolved in it at least one precursor of alumina in the form of one or more basic aluminum salts, such as aluminum chlorohydroxide, (approx. formula: $Al_2(OH)_5Cl.2H_2O$), basic aluminum nitrate, basic aluminum chloroacetate, and the like. Aluminum chlorohydroxide is preferred.

The solid particles provide between 35 to 75%, preferably 35 to 65%, by weight of the total available oxides in the mixture and the amount of $Al_2O_3$ available from the solid particles and precursor of alumina is at least 80% of the total available oxide content of the mixture.

A preferred particle for use in the mixture is obtained by fractionating $\alpha$-alumina (obtained from the Alcoa Company as "XA-16"). Its chemical composition is about 100% $Al_2O_3$. Another particle suitable for use in the mixture is gamma-alumina manufactured by Cabot Corporation as "Alon C" and having a particle size of $0.01\mu$ to $0.04\mu$ as specified by the manufacturer. Preferably, poly(ethylene oxide) is added to "Alon C" spinning mixes to improve extrudability. The chemicl composition of "Alon C" is about 100% $Al_2O_3$. Useful particles may also be obtained by grinding or ball-milling alumina until the desired size is obtained; or by pyrolyzing hydrated aluminum sulfate $[Al_2(SO_4)_3.18-H_2O]$ at 1000°C. and comminuting.

The mixture to be extruded is prepared by mixing the ingredients together until the mix becomes homogenous and reaches the desired viscosity. Suitable mixtures and their preparation are disclosed by Seufert and D'Ambrosio. The mix is dry spun (extruded), e.g., under ram pressures of 80 to 500 psi and spinning-cell temperatures of 20°–40°C., preferably through a spinneret having at least 30 orifices. The unfired filaments, containing about 30–60% volatiles, are then attenuated at the base of the spinning column by a pair of take-up rolls (after application of a finish to the threadline, if desired) and wound up at the desired speed (e.g., 100–1200 fpm), using a commercial windup machine (e.g., No. 959 Leesona Take-Up Machine). The amount of attenuation will depend on several factors among which are the particles used and the final properties desired.

The term "continuous" is used herein, in its usual textile significance, to denote a filament of indefinite length or a yarn of such filaments.

Since the as-spun filaments will shrink (linearly) from 15 to 25% or more upon being heated to about 300°C. or more, it is necessary for the best results to wind the yarn onto a collapsible, refractory bobbin. By the term "collapsible, refractory bobbin" is meant a bobbin (a) whose outside diameter will decrease and yield as compressive forces are placed on it as by a shrinking yarn and (b) that nevertheless retains its integrity as a support for the yarn during any heating steps on the bobbin. The refractory bobbin can consist of a rigid cylindrical core with an outer compressible layer, such as a felt or mat or refractory fibers that will survive subsequent heating, or of a combustible material that can burn out in firing, such as an elastic organic foam. The refractory bobbin may have a relatively rigid outer yarn-contacting surface that is compressible such as a rolled cylinder of sheet metal. Combinations of movable outer rigid surfaces with an inner compressive layer including springs can be used.

The yarn is wound up on the bobbin using a low winding tension (e.g., about 0.01 gram per denier), a suitable wind angle (preferably 7° – 19°) and a decreasing traverse stroke as the wound yarn builds up so as to form a cake with edges that taper inward. A preferred cake has a 3.5-inch inside diameter and 6-inch outside diameter, and any suitable width, e.g., 6inches. The wound yarn on the bobbin is called a yarn package.

The yarn package is first fired (heated) on the bobbin ("package firing") in order to reduce volatile extrusion mixture ingredients and to strengthen the fibers. In this firing, the package is heated to at least about 300°C., preferably to at least 350°C. for a time sufficient to reduce the volatiles content of the yarn to about 11%, by weight, or less. The upper temperature limit during this package firing can vary, depending upon whether it is carried out in one or two steps. It can be carried out in one low-temperature step by heating the yarn package between about 300°C. and 600°C. or it can be carried out in a two-step procedure where the yarn package is heated in a low temperature step between 300°C. and 600°C. and is then heated at a high temperature step between about 1000°C, and 1400°C. A third alternative is to heat the yarn package slowly from room temperature to between about 1000°C. and 1400°C.

The low-temperature step is preferably carried out in a furnace by slowly raising the temperature of the furnace from room temperature (about 25°C.) or thereabouts, preferably to about 550°–600°C., over a period of e.g., 1 to 2 hours, and holding the cake at the final temperature for a time sufficient to reduce volatile content below about 11%, e.g., 10 minutes to 2 hours. Although not necessary, a nitrogen purge can be used, if desired, to aid in keeping the filaments from sticking together and to assist in removing volatiles.

The high-temperature step, when used, is preferably carried out by taking the low-fired yarn package and transferring it to a preheated furnace (e.g., at about 1000°C.). The temperature is then raised to between 1000°C. and 1400°C., preferably 1300°C. over a period of e.g., 1–6 hours and kept at this final temperature for a time (e.g., 10 minutes to 2 hours) sufficient to strengthen the filaments to facilitate backwinding of the yarn from the bobbin.

The filaments are then subjected to yarn firing, preferably by flame-firing. In this step, the fired package (usually after cooling, but not necessarily) is mounted on a rotating spindle and the yarn backwound from the bobbin (e.g., at 20 feet/minute) through (horizontally or vertically a zone of intense heat such as is supplied by a tube furnace or an open flame from a combustible gas source. Preferably, the spindle and the yarn pulling means are carefully controlled to obtain a uniform minimum tension. The use of a flame from a suitable source (e.g., propane-air; propane-oxygen; natural gas-air) is preferred for this step. Apparent yarn temperatures of 1000°–1800°C. are commonly attained as measured by techniques described in the examples. A particularly desirable arrangement is to use a ring burner (e.g., made from ¼ inch outside diameter, stainless steel tubing with a ⅞ inch inside diameter, and having 0.020 inch diameter holes drilled every ⅛ inch around the ring at a 70° or 80° angle to the plane of the ring), to mount a chimney (e.g., 12 inches or more long and 2 inches inside diameter and lined with "Fiberchrome" felt) directly above or below the ring, and then pass the yarn vertically through the center of the burner and chimney to a windup. A tension brake can be employed prior to entry of the yarn into the chimney. Tension during the flame-firing step is maintained at a low level, but sufficient to keep the yarn from fluttering, e.g., with yarns containing "XA-16", tensions of about 0.002 to 0.03 gpd are used.

A preferred process uses a yarn containing at least 90 filaments and heats the package of yarn to about 300°C. to about 600°C., and then advances the yarn (off the package) through a zone of intense heat at a speed of at least 50 feet/minute to obtain an apparent yarn temperature of between about 1000°C. and about 1800°C.

EXAMPLE 1

This example illustrates preparation of continuous filament, alumina yarn.

Distilled water (279 lbs.) is added to a sedimentation tank (cylindrical tank, 38 inch inside diameter, settling area of about 7.9 sq. ft.). Then, concentrated 12 molar HCl (252 ml.) is added with stirring. To this, commercial Alcoa "XA-16" $Al_2O_3$ particulate (64.8 lbs.) is slowly added, while rapidly stirring with a 1 HP mixer ("Lightnin Mixer") turning a 3-bladed impeller. Stirring is continued for 45 minutes to 1 hour. The stirrer is then stopped and the slurry is allowed to stand undisturbed for 24 hours. The slurry is then drained from the tank via a ¼ inch line (centrally located, 1 inch from the bottom of the tank) through 100 mesh screens into 5 gallon bottles, at a flow rate of about 5 gallons per hour, i.e., slowly enough so that no motion is visible on the surface of the slurry in the tank. Yield is about 25 gallons of slurry.

The slurry is then weighed and concentrated. Initially, two 5-gallon bottles of slurry are charged into a 10 gallon stainless-steel steam-jacketed distillation kettle fitted with a stirrer. The remainder of the slurry is added to the kettle as water is distilled off at atmospheric pressure. Water equal to 83% of the total weight of the slurry is distilled off using about 10 lbs. of steam pressure on the kettle jacket. On analysis, the concentrated slurry so obtained has 73.8% by weight alumina particulate and 100% of the fractionated particles have an equivalent spherical diameter of less than 2 microns.

A spin-mix is made by blending the above slurry with an alumina precursor. Into a 2 liter mixing vessel ("Hastelloy B", height to depth ratio = 1), 1180 g. of the 73.8% by weight alumina slurry are added. To this, 410 g. of $H_2O$ and 30 grams of concentrated HCl are added and the vessel is sealed and placed in an 80°C. bath and stirred at slow speed with a helical ribbon impeller. Then 15 grams of $MgCl_2.6H_2O$ are added and the mix is again stirred for 30 minutes. Then the mixing speed is slowly increased to 400 rpm as 1240 grams of alumina precursor, solid aluminum chlorohydroxide ["Chlorhydrol" $Al_2(OH)_5Cl.2.2H_2O$], are slowly added (viscosity increases). After one hour, mixing speed is reduced to 300 rpm and mixing is continued overnight. The vessel is then placed in a 20°–25°C. bath and the mixing speed is reduced to 100 rpm and vacuum is applied to the vessel for simultaneous deaeration and cooling. During this step, water is removed and viscosity of the spin-mix increases. A small change near the end point in water content (about 0.5 weight %) changes viscosity of the mix by about 1000 poises. Viscosity is monitored by measuring the power output of the stirrer motor; as the spin-mix viscosity increases during cooling and deaeration, power is increased to maintain constant stirrer speed. Power required to maintain a constant stirrer speed is monitored and spin-mix viscosity is controlled to ± 100 poises. In this example, a spin-mix viscosity of 960 poises at 26°C. is obtained. Then, the spin-mix is transferred to a spinning cell (2.66 inch inside diameter and 17¼ inch long), by connecting the mixing vessel to the cell and drawing the mix into the cell by vacuum. After charging the cell, a nylon plug having an air purge valve is placed in one end of the cell and a spinneret, cap and filter assembly fixed to the other end.

The spinneret has 46 holes (each 0.004 inch in diameter and 0.045 inch long) arranged in concentric circles, there being 30 holes equally spaced on a 2½ inch diameter circle and 20 holes equally spaced on a 2 inch diameter circle (4 holes blanked off).

The cell, fitted with the spinneret and nylon plug, is mounted at the top of a 9 foot long spinning column and pressure is applied to the nylon plug by a hydraulic ram. At a ram pressure of 380–465 psi (about 1350–1650 psi cell pressure) filaments are extruded through the spinneret with a total mix flow rate of about 12 g./min. A nitrogen sweep of 10 standard cubic feet/minute (scfm) at 125°C. is introduced at the top of the spinning column and the column air temperature is maintained at 56°C. with a spinning cell temperature of 30°C. A relative humidity gradient is maintained (1.5% at the top to 23% at the bottom of the column). The filaments are drawn at the bottom of the column by two 6-inch diameter attenuating rolls mounted one above the other, both rotating at a surface speed of 500 fpm. The 46 filament yarn is drawn around the outside of the attenuating rolls for 4 wraps and then wound up under a tension of about 5–10 grams on a refractory bobbin mounted on a constant speed windup. The bobbin is made by rolling ¼ inch thick felt of refractory fibers ("Fiberfrax" Lo-Con-Felt) to form a cylinder, taping the cylinder with cellophane tape, and mounting it on a collapsible metal rolled cylinder, and then placing the whole assembly on a constant speed windup. A spin finish of 20% ethyl laurate and 80% Perclene perchloroethylene is applied to the yarn between the attenuating rolls and bottom of the column by drawing the yarn over a wick wet with the finish. A yarn package is collected in a 15 minute period. The yarn package on its refractory bobbin is placed first in a muffle furnace and heated to 900°C. over a period of 4 hours; and then in a second muffle furnace and heated to 1300°C. in a period of 6 hours. At this point, the filaments have tensile strengths greater than 100,000 psi and the yarn can easily be handled without extensive filament breakage. The bobbin of yarn is mounted on a freely rotating spindle with a rubber surfaced chuck and drawn horizontally at a rate of 10 ft.min. through a propane-air flame issuing from a 6 inch long ribbon burner. The apparent temperature of the fiber as measured by an optical pyrometer (with no correction for $Al_2O_3$ emissivity at high temperature) is 1300°C. The resultant filaments have an average tensile strength of 227,000 psi measured at 1/25 inch gauge length on individual filaments. Single filament diameter is about 0.0008 inch.

EXAMPLE 2

This example illustrates preparation of continuous filaments having a tensile strength of about 223,000 psi, a modulus of about 40,000,000 psi and containing 89.7% $Al_2O_3$, 10% $SiO_2$, $K_2O$, 0.07% $Li_2O$ and 0.25% MgO.

A slurry of "XA-16" alumina particles is prepared in similar fashion to that described for Example 1 except that amounts are changed and the final slurry has 69% fractionated alumina particulate.

A spin mix is made by blending 638 grams of the above slurry with the following: 423 grams of Positive Sol 130M [which is 30% solids (26% $SiO_2$, 4% $Al_2O_3$) aqueous dispersion of alumina coated $SiO_2$ particles (approximate diameter 16Mμ) sold by E. I. du Pont de Nemours and Company, Inc.], 14g. of $MgCl_2.6H_2O$, 4 grams of KCl, 2 grams of LiCl, 35 grams of concentrated HCl, 260 grams of $H_2O$ and 1150 grams of aluminum chlorohydroxide ["Chlorhydrol", $Al_2(OH)_5Cl.2.2H_2O$].

The mixture is stirred slowly and aged for 19 hours at 80°C. When it reaches a viscosity of 188,000 centipoises (cps.) at 26°C., it is spun using equipment and a bobbin similar to Example 1. The spinneret has 48 holes, each 4 mils (0.004 inch) in diameter and 47 mils (0.047 inch) long. Spinning cell temperature is 32°C., column air temperature is 57°–58°C. An air sweep of 10 scfm at 128°C. is used. The relative humidity is 1.5% at the top and 15–18% at the bottom. Ram pressure is 430–450 psi. Windup bobbin velocity is 550 fpm. A spin finish as in Example 1 is used. A yarn package is collected in a 14 minute period.

The yarn package on its bobbin is placed first in a muffle furnace, with a $N_2$ purge, at room temperature; then, the temperature is raised to 550°C. and the package is held at the 550°C. temperature for 60 minutes; total time in the furnace is 135 minutes.

The package on its bobbin is then placed in a second furnace (preheated to 1120°C.) and is kept there while the temperature is increased to 1200°C. Total time at 1200°C. is 60 minutes; total time in the furnace is 72 minutes.

After removal from the second furnace, the bobbin is mounted vertically on a freely rotating spindle and the continuous filament yarn is backwound therefrom at 20 ft./min. and passed vertically through a propane-air flame at an apparent yarn temperature of 1065°C. (temperature measured on yarn by Leeds & Northrup Model 8621-C optical pyrometer — without emissivity correction).

A starch sizing is applied to the filaments by back-winding the yarn at 20 ft./min. over a finish roll coated with a 2% aqueous solution of soluble starch (meets American Chem. Society Specifications "Reagent Chemicals" 1960).

The individual filaments of the final yarn have a tensile strength of about 223,000 psi measured at 1/25 inch gauge length and a modulus of about 40,000,000 psi. Single filament diameter is 0.00069 inch.

EXAMPLE 3

A concentrated slurry having 70% by weight fractionated "XA-16" particulate, the particles having equivalent spherical diameters less than $2\mu$, is prepared by the general procedure of Example 1.

A spin mix is made by blending 1250 grams of the above slurry with the following: 15 grams of $MgCl_2.6H_2O$, 30 grams of concentrated HCl, 360 grams of $H_2O$, and 1260 grams of aluminum chlorohydroxide, "Chlorhydrol".

The mixture is stirred slowly and aged for 19 hours at 80°C. When it reaches a viscosity of 80,000 cps. at 26°C., it is spun using equipment similar to that of Example 1. The spinneret has 47 holes, each 4 mils (0.004 inch) in diameter and 44 mils (0.044 inch) long. Spinning cell temperature is 30°C.; column air temperature is 56°C. An air sweep of 10+ scfm at 102°C. is used. The relative humidity is 3.5% at the top and 4.0% at the bottom. Ram pressure is 400–420 psi. Windup bobbin velocity is 600 fpm. A spin finish as in Example 1 is used. Yarn packages are collected in 10 to 13 minute periods. The yarn package on its collapsible "Fiberfrax" bobbin is stored in dehumidified air at 1100°–120°F. prior to firing. The package on its bobbin is then placed in a muffle furnace, with a nitrogen purge, at about 50°C. and the temperature is then raised to 550°C.; the package is kept at 550°C. for 60 minutes; total time in the furnace is 137 minutes.

The package on its bobbin is then placed in a second furnace (preheated to 1040°C.) and is kept there while the temperature is increased to 1300°C. Total time at 1300°C. is 60 minutes; total time in the furnace is 134 minutes.

The bobbin is then removed from the second furnace, mounted vertically on a freely rotating spindle, and the continuous filament yarn is backwound therefrom at 20 ft./min. and passed vertically upward through the center of a propane-oxygen oxygen flame, from a ½ inch diameter ring burner, the apparent yarn temperature being 1395°C. (measured on the yarn by a Leeds & Northrup Model 8622-O optical pyrometer, without emissivity correction).

Filament tensile strengths (average of 3 determinations) were measured at various stages of processing, and results are given below:

| Filament Description | Tensile Strength (psi) | Filament Diameter (mils) |
|---|---|---|
| As-spun (green) | 2,895 | 1.10 |
| After 550°C. firing | 37,000 | 0.93 |
| After 1300°C. firing | 132,000 | 0.81 |
| After flame-firing | 227,000 | 0.77 |

Figure 2:
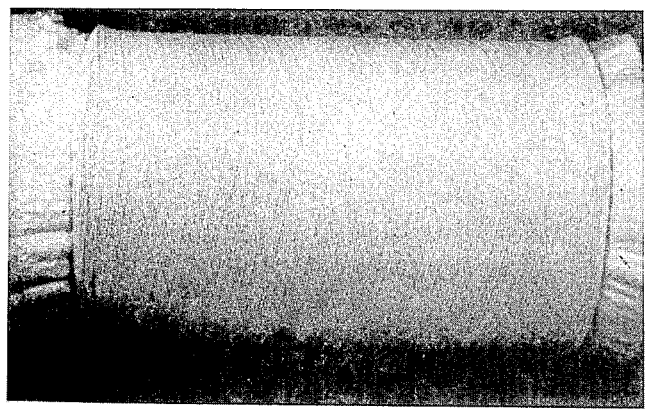
Figure 3:
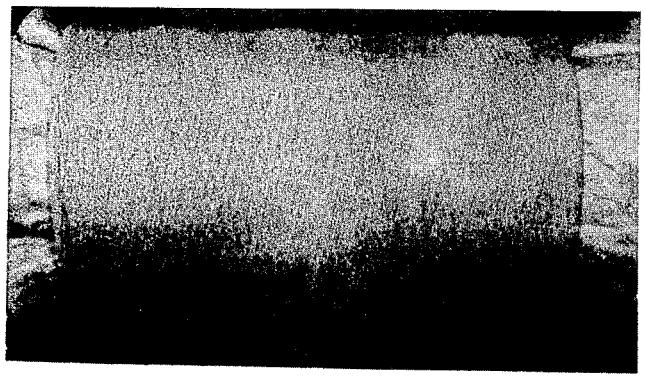
Figure 4:
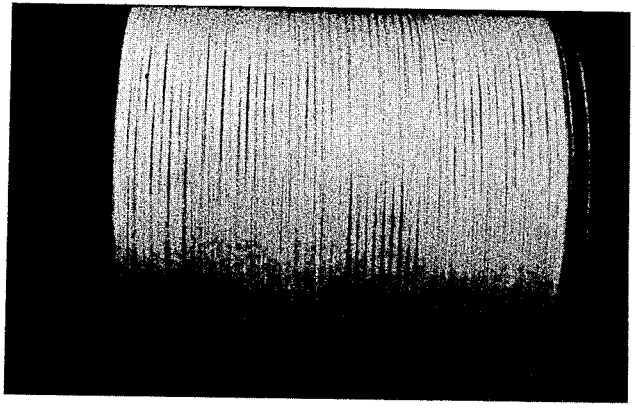

FIGS. 1 to 3 show the multifilament yarn on its "Fiberfrax" bobbin as-spun, after 550°C. firing, and after the 1300°C. firing step; FIG. 4 shows the final bobbin of flame-fired, straight continuous filament yarn.

EXAMPLE 4

This example illustrates preparation of yarn from "Alon C" particulate.

A spin mix is made by blending 770 gms. of water, 10 gms. of $MgCl_2.6H_2O$, 150 gms. of $AlCl_3.6H_2O$ and 15 gms. of concentrated HCl (12 N) in a 2 liter mixing vessel ("Hastelloy B", height to depth ratio = 1). The vessel is sealed, placed in an 80°C. bath and stirred for 30 minutes. To this, 500 gms. of "Alon C" alumina particulate, having a diameter of about 0.03 microns, is added and the mixing speed is increased from 200 rpm. to 300 rpm. Mixing at this speed is continued for 45 minutes. As 1200 gms. of alumina precursor, solid aluminum chlorohydroxide, "chlorhydrol", are slowly added (viscosity increases), the mixing speed is slowly increased to 400 rpm. After one hour, mixing speed is reduced to 300 rpm and mixing is continued overnight. The stirrer is then stopped and 130 gms. of a 10% solution of high molecular weight poly(ethylene oxide) (WSRN-3000 "Polyox" having a viscosity of 3000 cps in a 5% solution at 25°C.) is added to the spin mix. Mixing is continued for 30 minutes. The vessel is then placed in a 20°–30°C. bath and the mixing speed is reduced to 100 rpm and vacuum is applied to the vessel for simultaneous deaeration and cooling. During this step, water is removed and the viscosity of the spin mix increases. A small change in the water content (about 0.5 weight %) changes the viscosity of the mix about 2000 poises. Viscosity is monitored by measuring the power output of the stirrer motor; as the spin mix viscosity increases during cooling and deaeration, power is increased to maintain constant stirrer speed. Power required to maintain a constant stirrer speed is monitored and spin mix viscosity is controlled to ± 500 poises. A spin mix viscosity of 4000 poises at 26°C. is obtained. At this point, the spin mix is transferred to a apinning cell (2.66 inch inside diameter and 17¼ inch long); the cell is charged and fitted with spinneret, cap and filter assembly as in Example 1.

The spinneret has 75 holes (each 6 mils in diameter and 50 mils long) arranged in concentric circles, there being 30 holes equally spaced on a 2½ inch diameter circle, 20 holes equally spaced on a 2 inch diameter circle, 15 holes equally spaced on a 1½ inch diameter circle and 10 holes equally spaced on a 1 inch diameter circle.

The cell, fitted with the spinneret and nylon plug, is mounted at the top of a 9 foot long spinning column and pressure is applied to the nylon plug by a hydraulic ram. At a ram pressure of 80–90 psi (300 psi cell pressure) filaments are extruded through the spinneret with a total mix flow rate of 1.5 gms./min. An air sweep of 10 scfm at 125°C. is introduced at the top of the spinning column and the column air temperature is maintained at 58°C. with a spinning cell temperature of 32°C. A relative humidity gradient is maintained (1.5% at the top to 12% at the bottom of the column). The filaments are drawn at the bottom of the column by two 6 inch diameter attenuating rolls mounted one above the other, both rotating at a surface speed of 100 fpm. The 75 filament yarn is drawn around the outside of the attenuating rolls for 4 wraps and then wound up under a tension of about 2–5 grams on a collapsible, refractory, "Fiberfrax" bobbin of the type described in Example 1, mounted on a constant speed windup. A spin finish is applied as in Example 1. A yarn package is collected in a 20 minute period. The package, on its refractory bobbin, is placed in a muffle furnace and heated from room temperature to 550°C.; it is kept at 550°C. for 60 minutes; total time in the furnace is about 130 minutes. It is then placed in a second muffle furnace which is at 1040°C. and the temperature is raised to 1300°C. The package is kept at 1300°C. for 60 minutes. Total time in the furnace is about 130 minutes.

The bobbin of yarn is mounted vertically on a freely rotating spindle and the yarn is drawn horizontally through a natural gas-air flame (about 1 inch wide) issuing from a modified Fisher burner. The resultant filaments have an average tensile strength of 225,000 psi measured at 1/25 inch gage length on individual filaments. Single filament diameter is 0.0003 inch.

EXAMPLE 5

A spin mix is made by adding 318 parts of an alumina dispersion as made in Example 1 but containing 66% alumina, 4.40 parts $MgCl_2.6H_2O$, 7.90 parts $AlCl_3..6H_2O$ and 8.10 parts concentrated hydrochloric acid in 72.3 parts of water to a jacketed mixing vessel. The mixture is heated to 80°C., held at 80°C. for 30 minutes and 322 parts of aluminum chlorohydroxide, "Chlorhydrol", added. The mixture is held at 80°C. and stirred for about 12–16 hours. Vacuum is applied with stirring to deaerate and remove water until the mixture has a viscosity of about 1200 poises at 30°C. At this point, a total of about 28 parts of water has been removed from the original mix.

The spin mix is pumped to a spinning head, through filters and at a temperature of about 40°C. through a spinneret (60 holes of 4 mil diameter and 8 mil length) down into a 5 foot long spinning column. Predried air at a rate of about 2.2 scfm is heated and enters the top of the spinning column. The air temperature just below the spinneret is 85°C. The column walls are heated to a temperature of about 89°C. The 60 filament yarn is attenuated by passing it around two 6 inch diameter rolls, both running at a surface speed of 500 feet per minute and located at the bottom of the column. A spin finish of 20% ethyl laurate and 80% Perclene perchloroethylene is applied to the yarn just prior to the two rolls. The attenuated yarn which contains about 40% volatiles (water and HCl) is wound up under a tension of 5–10 grams on a collapsible bobbin.

The collapsible bobbin consists of a sheet of 5 mil thick aluminum metal rolled to a 4 inch diameter cylinder with about 0.5 inch overlap of the edges. This is placed on a normal textile fiber core covered with a 0.25 inch layer of "Fiberfrax". Collapsible bobbins can also be made of 5 to 10 mil thick sheets of stainless steel or Inconel 600 (by Rodney Metals of Pico Rivera, Cal.).

Bobbins of yarn prepared by the above method are slid from the normal core and stored in a box at 52°C. and 25% RH for 1 to 3 days. They are then placed on a 2⅛ inch diameter stainless steel tube, placed in a cold muffle furnace and heated at a rate of about 5°C. per minute to the maximum temperature desired and held at that temperature for a given time and cooled. A slight purge of nitrogen gas is passed through the furnace to carry off volatiles. The bobbin of fired yarn is placed on a chuck rotated by an air motor and controlled by a dancer arm to unwind the yarn at constant tension. The yarn is passed at 40 feet/minute through a ring burner and up a 12 inch high chimney to a windup. The yarn has an apparent (uncorrected for emissivity) temperature of about 1450°C. in the propane-oxygen flame of the burner (measured with an optical pyrometer).

Some bobbins of oven-fired yarn yield no flame-fired yarn while others may process completely to give typically about 260 grams of yarn. The yield is calculated from the total weight of flame-fired yarn on all packages (each having at least 50 grams of yarn) obtained from a given bobbin based on the theoretical weight of the yarn available from the bobbin. It should be noted that a number of process variables other than the oven firing can influence the yield.

The % volatiles present in the oven-fired yarn is determined by heating about a 10 mg. sample to 650°C. at a rate of 20°/minute in a Thermal Gravimetric Analyser (Model 950, made by E. I. du Pont de Nemours and Company, Inc., Wilmington, Delaware).

Results obtained on bobbins of yarn from two different spins are given in Table I. The fired yarns with deniers in the range of from 750 to 850 are strong, useful yarns with filament tensile strengths above 200,000 psi.

It is concluded that the yarns should be fired to reduce the volatile content to less than about 11% before flame-firing for a final denier of about 750. Slightly higher volatiles can be tolerated with higher denier yarns.

EXAMPLE 6

A. A spin mix containing about 30.4% of alumina particles, 42.7% solid aluminum chlorohydroxide, "Chlorhydrol", 2.5% concentrated hydrochloric acid, 0.65% $MgCl_2.6H_2O$ and 23.7% water is made from a sedimented slurry of "XA-16" $Al_2O_3$ particles using the general procedure of Example 1 except that the ingredients are mixed and water removed at 55°C.

The spin mix (viscosity about 800 poises at 30°C.) is extruded at about 32°C. through a spinneret (210 holes of 4 mils diameter and 12 mils length) downward into a 10 foot long spinning column with walls heated to about 45°C. Predried air (25 scfm) is heated and enters the top of the column to give an air temperature just below the spinneret of about 90°C. The extruded yarn is attenuated by two 6 inch feed rolls (surface speed of 900 feet/minute) located at the bottom of the column and then wound up under a tension of 20 grams on a collapsible, refractory bobbin. The bobbin consists of 3 layers of 1/16 inch organic microfoam on a 3.25 inch diameter aluminum tube. A spin finish of 5% ethyl laurate in a fluorocarbon (Valclene 1 Drycleaning Fluid, B.P. about 118°F.) is applied to the yarn just prior to the feed rolls.

The bobbins of yarn are stored in a room at 40% relative humidity until fired. The bobbins are placed in a cold oven which is then heated to 550°C. in about 2 hours, held at 550°C. for 45 minutes and cooled. Bobbins of yarn prepared in this manner (about 2000 final denier for the 210 filaments) typically contain 4.4–5.1% volatiles.

A fired bobbin is placed on a chuck rotated by an electric motor and the yarn backwound and conducted vertically downward through a chimney above a ring burner with propane-oxygen flames and the yarn wound up. The results are given in Table II as items a–e. A 24 inch chimney is used for all items except e (36 inch). A comparison of items d, b and e indicates the need for higher temperatures to achieve high strength as the speed of firing is increased.

B. Bobbins of yarn fired at 550°C. are made using the procedure of part A except for a 356 hole spinneret. The low fired yarn typically contains from 5.1 to 6.6% volatiles. The yarns are fired in a flame with results given at items f and g in Table II.

TABLE I

| Item | Oven Maximum °C. | Hours at Maximum | Yarn % Volatiles | Flame-Fired Yarn Yield % |
|---|---|---|---|---|
| a | 350 | 2 | | 86 |
| b | 350 | 2 | 10.5 | 21 |
| c | 400 | 1 | | 70 |
| d | 450 | 0 | | 95 |
| e | 450 | 1 | | 99 |
| f | 450 | 1 | 9.5 | 0 |
| g | 500 | 0 | | 93 |
| h | 500 | 0 | 7.9 | 41 |

TABLE II

| Item | Yarn Denier/No. Filaments | Speed Feet/Min. | Apparent Temp. of Yarn, °C. | Filament Tensile Strength psi × $10^{-3}$ |
|---|---|---|---|---|
| a | 2100/210 | 60 | 1475 | 164 |
| b | 2100/210 | 60 | 1535 | 183 |
| c | 2100/210 | 60 | 1595 | 206 |
| d | 2040/210 | 30 | 1560 | 195 |
| e | 1960/210 | 180 | 1620 | 185 |
| f | 3500/356 | 30 | 1615 | 186 |
| g | 4080/356 | 85 | 1700 | 160 |

Test Procedures

Filament tensile strengths for Examples 1–5 are measured using a method described by R. D. Schile et al. in "Review of Scientific Instruments", No. 8, August, 1967, pp. 1103–4. The gauge length is 0.04 inch (0.1 cm.) and the crosshead speed is 0.0016 inch/min. (0.0041 cm./min.). Filaments of Example 6 are measured on an Instron Machine using a gauge length of 0.25 inch and a crosshead speed of 0.02 inch/minute.

Modulus is determined by vibroscope techniques as described in *Journal of Applied physics*, Vol. 26, No. 7, 786–792, July, 1955.

Yarn tensile strength is obtained by using an Instron Testing Machine with a "C" cell and C-type clamps and determining the breaking force of a 1 inch gauge length of yarn, using the formula:

$$\text{Tensile Strength (psi)} = \frac{\text{breaking force} \times \text{fiber density} \times 1.6 \times 10^7}{\text{denier}}$$

where breaking force is in lbs.; fiber density is in lbs./cu. in, and denier is the weight in grams of 9000 meters of the yarn prior to application of cement.

Mounting is done by applying "Duco" household cement along a 2 foot freely suspended length of yarn, without rolling or abrading the yarn; drying the yarn; cementing it to a support and mounting the support in the jaws of the Instron such that only the support contacts the jaws and the yarn is subjected to lengthwise stress. The support is a 3 inch × 2 inch rectangle of 20 lb. weight paper; a 1 inch diameter hole is punched in the center of the rectangle; a 1.5 to 1.75 inch length of cemented yarn is attached to the support so that the yarn is straight along the long axis of the support and spans the hole at its center. Cement should extend to the edge of the hole; the mount is allowed to dry overnight with the edges weighted to minimize curling. After clamping in the Instron, the support is cut between the center hole and the long edges, so that only the yarn is subjected to stress.

The equivalent spherical diameter of the solid oxide particles is determined using an Andreasen pipette in accordance with a procedure described by G. A. Loomis in the "Journal of the American Ceramic Society", Volume 21, page 393 ff.

The fibers produced by this invention are useful as reinforcing fibers for metal, thermoset resins, and plastic composites for structural applications such as turbine blades, helicopter rotors and printed circuit boards. Their thermostability also makes them useful as catalyst supports and high temperature insulation.

Having thus described the invention, what is claimed as new and desired to be secured by Letters Patent is:

1. In a process for producing continuous polycrystalline alumina yarns by extruding through a spinneret having a plurality of orifices to form a continuous multiple filament yarn of continuous filaments a mixture comprising solid particles in an aqueous phase, said solid particles
    a. being smaller than $5\mu$, with at least 98% of the particles by weight being smaller than $3\mu$ as measured for equivalent spherical diameter,
    b. having no dimension less than about $0.005\mu$ measured by electron micrograph,
    c. being at least 80% by weight alumina, said aqueous phase having dissolved therein at least one basic aluminum salt precursor of alumina; the ingredients being present in such proportions that the solid particles provide between about 35 to 75% by weight of the total available oxides in the mixture; and the amount of alumina available from the solid particles and the precursor of alumina is at least 80% of the total available oxide content of the mixture, the improvement comprising:
    1. winding the yarn of freshly extruded multiple filaments, which contain about 30% to about 60% volatiles, onto a collapsible, refractory bobbin to form a shrinkable, continuous filament yarn package,
    2. heating the yarn package to between about 300°C. and 1400°C. for a time to reduce the volatiles content of the yarn to about 11% or less, and
    3. unwinding the yarn from the yarn package and advancing it through a zone of intense heat, thereby heating the yarn to an apparent temperature of between about 1000°C. and about 1800°C.

2. Process of claim 1 wherein the unwound yarn is advanced through a flame.

3. The process of claim 1 wherein the package firing step is carried out by first subjecting the package to heat by slowly raising the temperature from about room temperature to about 300°–600°C. and holding the package at that temperature to reduce volatiles content.

4. In a process for producing continuous polycrystalline alumina yarns by extruding filaments from a mixture of alumina particles and an aqueous solution of an alumina precursor, the improvement comprising
    winding the yarn of freshly extruded multiple filaments, which contain about 30–60% volatiles, onto a collapsible, refractory bobbin to form a shrinkable, continuous filament yarn package, heating the yarn package to between about 300°C. and 1400°C. for a time to reduce the volatiles content of the yarn to about 11% or less, and unwinding the yarn and advancing it through a zone of intense heat, thereby heating the yarn to an apparent yarn temperature of between about 1000°C. and about 1800°C.

\* \* \* \* \*